United States Patent [19]
Yamamoto

[11] Patent Number: 5,414,849
[45] Date of Patent: May 9, 1995

[54] EVALUATING METHOD OF DATA DIVISION PATTERNS AND A PROGRAM EXECUTION TIME FOR A DISTRIBUTED MEMORY PARALLEL COMPUTER SYSTEM, AND PARALLEL PROGRAM PRODUCING METHOD USING SUCH AN EVALUATING METHOD

[75] Inventor: Fujio Yamamoto, Higashiyamato, Japan

[73] Assignee: Hitachi, Ltd., Tokyo, Japan

[21] Appl. No.: 74,228

[22] Filed: Jun. 9, 1993

[30] Foreign Application Priority Data

Oct. 30, 1992 [JP] Japan .................. 4-292435

[51] Int. Cl.⁶ .............................. G06F 9/40
[52] U.S. Cl. ..................... 395/650; 364/DIG. 1; 364/280; 364/281.3; 364/281.7; 364/281.8
[58] Field of Search ................ 395/650, 700

[56] References Cited

U.S. PATENT DOCUMENTS

| | | | |
|---|---|---|---|
| 5,293,620 | 3/1994 | Barabash et al. | 395/650 |
| 5,301,320 | 4/1994 | McAtee et al. | 395/650 |
| 5,303,369 | 4/1994 | Borcherding et al. | 395/650 |
| 5,325,493 | 6/1994 | Herrell et al. | 395/375 |

OTHER PUBLICATIONS

Balasundaram, Vasanth, et al. "An Interactive Environment for Data Partioning and Distribution," Fifth Distributed Memory Computing Conference, Charleston, S. Carolina, Apr. 9-12, 1990, pp. 1160-1170.

Gupta, Manish, et al. "Demonstration of Automatic Data Partitioning Techniques for Parallelizing Compilers on Multicomputers," IEEE Transactions on Parallel and Distributed Systems, vol. 3, No. 2, Mar. 1992, pp. 179-193.

Li, Jingke, et al. "Index Domain Alignment: Minimizing Cost of Cross-Referencing Between Distributed Arrays," Proceedings of Frontier's 90, 1990, pp. 424-433.

Hiranandani, Seema, et al. "Compiler Optimizations for Fortran D on MIMD Distributed-Memory Machines," Proceedings of Supercomputing '91, 1991, pp. 86-100.

*Primary Examiner*—Kevin A. Kriess
*Attorney, Agent, or Firm*—Fay, Sharpe, Beall, Fagan, Minnich & McKee

[57] ABSTRACT

For candidates of a plurality of data dividing patterns which are expressed by using a data dividing pattern library, in a case where data and program are allocated to each processor by a method which has been predetermined in correspondence to each data dividing pattern and are executed, an evaluating program to measure an amount about the processing time is produced. By executing the evaluating program by a sequential computer, a plurality of data division candidates are compared and evaluated and the optimum data division is selected. Distributed memory parallel programs are produced in accordance with the optimum data division.

19 Claims, 17 Drawing Sheets

FIG. 2

1 SEQUENTIAL SOURCE PROGRAM

```
201 ── float a[n][n];
202 ── for(k=0; k<n-1; k++){
203 ──── for(i=k+1; i<n; i++){
204 ────── a[i][k]=a[i][k]/a[k][k];
205 ────── for(j=k+1; j<n+1; j++){
        a[i][j]=a[i][j]-a[i][k]*a[k][j];
      }
    }
  }
```

FIG. 6

101 — LEFT SIDE ARRAY ELEMENT ALLOCATION PE OBTAINING CODE (CODE-L)
- EXTRACT SUFFIXES (s,t) OF LEFT SIDE ARRAY ELEMENT
- SET THE PE No. LHSPE TO WHICH THE ARRAY ELEMENT BELONG INTO SPLITF(s,t) (SPLITF IS A GENERAL NAME OF DATA DIVIDING FUNCTION FPE)
- ADD ARITHMETIC OPERATION AMOUNT REQUIRED FOR RIGHT SIDE CALCULATION TOPEOP (LHSPE)

102 — OBTAINING CODE (CODE-R) OF THE PE NO. TO WHICH THE SCALAR COMMUNICATION ARRAY ELEMENT OF RIGHT SIDE BELONGS
- EXTRACT SUFFIXES (s,t) OF LEFT SIDE USING ARRAY ELEMENT
- SET THE PE No. RHSPE TO WHICH THE ARRAY ELEMENT BELONG INTO SPLITF(u,v)

103 — CODE FOR ANALYSIS OF SCALAR TYPE COMMUNICATION (CODE-S)
- SET LOOP IN WHICH THE COMMUNICATING POSITION MARK EXISTS INTO X
- WHEN LHSPE DIFFERS FROM RHSPE FOR THE ARRAY ELEMENT, X_TAB(LHSPE) = RHSPE + 1 IS SET

104 — CODE FOR ANALYSIS OF VECTOR TYPE COMMUNICATION (CODE-V)
- SET LOOP IN WHICH THE COMMUNICATING POSITION MARK EXISTS INTO X
- SET VECTOR SUFFIX OF VECTOR TYPE COMMUNICATION TARGET ARRAY ELEMENT INTO J
- WHEN LHSPE DIFFERS FROM RHSPE FOR THE ARRAY ELEMENT, THE FOLLOWING TWO EQUATIONS ARE EXECUTED
  X_VTAB(LHSPE,J) = RHSPE + 1 ;
  X_VTAB(LHSPE,RHSPE) = 1 ;

105 — SCALAR TYPE COMMUNICCATION SITUATION CUMULATIVE PROCESSING CODE (CODE-SE)
- SET LOOP IN WHICH THE SCALAR TYPE COMUNICATING POSITION MARK EXISTS INTO X
- THE NUMBER OF DATA WHICH IS RECEIVED BY THE PEp IS ACCUMULATED FROM X_CTAB TABLE TO TCOMM TABLE
- DIAGONAL PORTION OF TCOMM TABLE IS INCREASED BY 1 AS THE NUMBER OF RECEIVING TIMES AT WHICH THE PEp RECEIVES THE DATA
- CLEAR X_CTAB TABLE

106 — VECTOR TYPE COMMUNICCATION SITUATION CUMULATIVE PROCESSING CODE (CODE-VE)
- SET LOOP IN WHICH THE SCALAR TYPE COMUNICATING POSITION MARK EXISTS INTO X
- THE NUMBER OF DATA WHICH IS RECEIVED BY THE PEp IS ACCUMULATED FROM X_VTAB TABLE TO TCOMM TABLE
- X_VTAB IS ADDED TO THE DIAGONAL PORTION OF TCOMM TABLE AS THE NUMBER OF RECEIVING TIMES AT WHICH THE PEp RECEIVES THE DATA
- CLEAR X_VTAB AND C_VTABX TABLE

107 — CODE TO SUMMARIZE COMMUNICATION SITUATION OVER WHOLE PROGRAM (CODE-SUM)
- ARITHMETIC OPERATION AMOUNT OF EACH PE, TOTAL RECEPTION DATA AMOUNT, THE TOTAL NUMBER OF RECEIVING TIMES
- AVERAGE LOAD OF THE PE, STANDARD DEVIATION OF LOAD, COMMUNICATION DENSITY
- THE NUMBER OF ARITHMETIC OPERATING TIMES/THE NUMBER OF RECEPTION DATA, THE NUMBER OF RECEPTION DATA /THE NUMBER OF RECEIVING TIME
- SELECT OPTIMUM DIVISION FROM AMONG TARGET DATA DIVISION CANDIDATES
- OUTPUT GRAPHICS OF THE ABOVE SUMMARY

FIG. 8

12 EVALUATING PROGRAM OF DATA COMMUNICATION

```
01  for(k=0 ; k<n-1 ; k++) {
02    rhslpe=splitf(kk) ; /*splitf IS DATA DIVIDING FUNCTION*/
03    /*==1== SCALAR A(k,k) COMMUNICATING POSITION*/
04    /*==3== VECTOR A(k,j) (j=k+1,n-1) COMMUNICATING PSITION*/
05    for(I=K+1 ; i<n ; i++) {/*A(i,k)/A(k,k)*/
06      lhspe=aplitf(i,k) ; peop[lhspe]++ ;
07      if(lhspe!=rhs1pe) k_ctab[lhspe]=rhslpe+1 ;
08      rhs2pe=splitf(i,k) ;
09      /*==2== SCALAR A(i,k) COMMUNICATING POSITION*/
10      for(j=k+1 ; j<n ; j++) {/*A(i,j)=A(i,j)-A(i,k)*A(k,j)*/
11        lhspe=splitf(i,j) ; peop[lhspe]=peop[lhspe]+2 ;
12        if(lhspe!=rhs2pe) i_ctab[lhspe]=rhs2pe+1 ;
13        rhs3pe=splitf(k,j) ;
14        if(lhspe!=rhs3pe) {
15          i_vtab[lhspe][j]=rhs3pe+1 ;
16          i_vtab[lhspe][rhs3pe]=1 ;
17        }
18      }/*endj*/
19      /*==2== INTERMEDIATE summary*/ OF SCALAR A(j,k)
20      for(rf=0 ; rf<p ; rf++) {
21        if(i_ctab[rf]>=1) {
22          tcomm[rf][i_ctab[rf]-1]++ ;
23          tcomm[rf][rf]++ ; i_ctab[rf]=0 ;
24        }
25      }
26    }/*endi*/
27    /*==3== INTERMEDIATE summary*/ OF VECTOR
                    A(k,j) (j=k+1,n-1) COMMUNICATION
28    for(rf=0 ; rf<p ; rf++) {
29      for(rg=0 ; rg<n ; rg++) {
30        iwork=i_vtab[rf][rg] ;
31        if(iwork>=1) {
32          tcomm[rf][iwork-1]++ ; i_vtabx[rf][rg]=0 ;
33        }
34      }
35    }
36    for(rf=0 ; rf<P ; rf++) {
37      for(rg=0 ; rg<P ; rg++) {
38        tcomm[rf][rf]+=i_vtabx[rf][rg] ; i_vtabx[rf][rg]=0 ;
39      }
40    }
41    /*==1== INTERMEDIATE summsry*/ OF SCALAR
                    A(k,k9 COMMUNICATION
42    for(rf=0 ; rf<P ; rf++) {
43      if(k_ctab[rf]>=1) {
44        tcomm[rf][k_ctab[rf]-1]++ ;
45        tcomm[rf][rf]++ ; k__ctab[rf]=0 ;
46      }
47    }
48  }/*endk*/
```

FIG. 10

10 DATA DIVIDING PATTERN

1001 ○ DATA DIVIDING FUNCTION 1 (COLUMN DIVISION)

$$f_{PE}(i,j) = j/(n/p)$$

1002 ○ DATA DIVIDING FUNCTION 2 (CYCLE COLUMN DIVISION)

$$f_{PE}(i,j) = mod(j,p)$$

1003 ○ DATA DIVIDING FUNCTION 3 (ROW DIVISION)

$$f_{PE}(i,j) = i/(n/p)$$

1004 ○ DATA DIVIDING FUNCTION 4 (CYCLE ROW DIVISION)

$$f_{PE}(i,j) = mod(i,p)$$

1005 ○ DATA DIVIDING FUNCTION 5 (BLOCK DIVISION)

$$f_{PE}(i,j) = (i/(n/\sqrt{p})) * \sqrt{p} + j/(n/\sqrt{p})$$

1006 ○ DATA DIVIDING FUNCTION 4 (CYCLE BLOCK DIVISION)

$$f_{PE}(i,j) = mod(i,\sqrt{p}) * \sqrt{p} + mod(j,\sqrt{p})$$

(NOTE) $\begin{pmatrix} f_{PE}(i,j) : \text{MAPPING FROM ARRAY ELEMENT} \\ \qquad\qquad (i,j) \text{ TO PROCESSOR NO.} \\ n : \text{SIZE OF DIMENTION OF ARRAY} \\ p : \text{NUMBER OF PROCESSORS} \end{pmatrix}$ (○ IS A SELECTED DIVISION FUNCTION)

1503 DISTRIBUTION OF THE NUMBER OF DATA RECEIVING TIMES

1504 DATA TRANSMISSION AND RECEPTION MATRIX (NOTE) NUMERICAL VALUE IN THE DIAGRAM INDICATES PROCESSOR NO.
(EXAMPLE RELATES TO THE CASE OF 4 PROCESSORS)

EVALUATING METHOD OF DATA DIVISION PATTERNS AND A PROGRAM EXECUTION TIME FOR A DISTRIBUTED MEMORY PARALLEL COMPUTER SYSTEM, AND PARALLEL PROGRAM PRODUCING METHOD USING SUCH AN EVALUATING METHOD

BACKGROUND OF THE INVENTION

The present invention relates to an evaluating method of the data division which is necessary for allowing a sequential program for technical calculations or the like to be efficiently executed by a parallel computer of a distributed memory. The invention also relates to a program converting method which uses such an evaluating method and which is used to convert the sequential program into the parallel programs to be executed by a parallel computer.

In the numerical simulation, in accordance with a variety of objects to be analyzed and precision of the analyzed contents, there is increasing a demand to further promote studies and developments by obtaining the results of large scale calculations in a short time. As a powerful machine which can satisfy such a demand, an expect to a massively parallel computer of a distributed memory is more and more increasing.

As shown in FIG. 20, a distributed memory parallel computer is a parallel computer in which a number of processors 200 each of which is connected to each of local memories 100 are coupled by a network 300. Each local memory is used as a main memory of the processor connected to such a local memory. Each local memory holds data allocated to the processor connected to such a local memory and a program to execute processes allocated to such a processor. Such a distributed memory parallel computer has an advantage such that each processor can execute the program asynchronously with the other processors.

In case of producing parallel programs to be executed by such a parallel computer, however, the time to execute the programs by the parallel computer largely depends on a method of forming such programs.

In the conventional technique, however, in many cases, it can be said that the works to produce the parallel programs for allowing the processes which are required in the sequential program to be efficiently executed by such a massively parallel computer are performed by manual works of users.

FIG. 2 is a diagram showing an example of a sequential source program. It shows a forward substitution part of a program by a Gaussian eliminating method. Numeral 203 denotes a process to divide the elements of a column just under the diagonal elements of a two-dimensional array a[i][j] by the diagonal elements. Numeral 205 denotes a process to update the matrix elements of an uneliminated portion from the elements of certain row and column of the present diagonal elements. The whole program is constructed by triple loops of loops 201, 202, and 204. Among the triple loops, the loops 202 and 204 are loops which can be executed by parallel processes. That is, the processes at different numbers of loop repeating times of those two loops can be executed by different processors.

In case of converting such a sequential program into parallel programs to be executed by each processor of the parallel computer, at least the following three items must be determined.

(1) Division of data (namely, array)

Generally, since the number of elements of an array to be processed is larger than the number of processors, those elements are divided into groups each having a plurality of data. As will be explained hereinlater, it is known that various kinds of data dividing patterns.

(2) Allocation of the data groups obtained by the division to each processor.

(3) Allocation of the processes to each processor

Decision is made with respect to that the processes at which one of the numbers of repetition times of the loops which can be executed by parallel processes in the sequential program are executed by each processor.

In the distributed memory parallel computer mentioned above, the program allocated to each processor is formed in a manner such that in the data allocated to the processor, the data which is necessary for the other processors is transmitted to the other processors at a proper timing and that in the data allocated to the other processors, the data which is necessary by the processor and which has been transmitted from the other processors is used at a proper timing.

The time which is required to transfer certain data between the processors is extremely longer than the time which is required to execute arithmetic operations for such data in either one of the processors. Therefore, the executing time of the parallel programs also largely depends on an amount of data that is transferred between the processors and the time which is required to transfer each data. The data amount depends on the processes themselves written in the sequential program and the above three processing methods.

In spite of the fact that the executing time of the parallel programs depends on the above three processes as mentioned above, the conventional technique cannot automatically do the above three processes so as to reduce the executing time of the parallel programs.

There is, consequently, troublesomeness such that the user must decide the above three processing methods.

Furthermore, since the executing time of the parallel programs depends on the data communication amount between the processors and the like as mentioned above, there is a problem such that the user cannot always make an ideal decision from a viewpoint of the reduction of the executing time of the parallel programs.

One of the methods for solving the above problems has been described in the papers of "Proceedings of the Fifth Distributed Memory Computing Conference", pages 1160 to 1170, 1990. According to the above method, after the user manually instructed a data dividing pattern that is considered to be optimum with respect to the array which is processed by a sequential program, the allocation of data (array elements) to each processor is determined in accordance with a format which is determined by the designated data dividing pattern and, further, the process to be allocated to each processor among the processes written in the sequential program is automatically decided. That is, the processses (2) and (3) among the above three processes (1) to (3) are automatically executed.

According to the conventional technique, when the processes are allocated to each processor, the processes which are allocated to each processor are determined so that the processor executes the definition sentences to the array elements allocated to the processor. In the above case, when the data which is used in the process allocated to either one of the processors is the data allocated to the other processor, the program sentences to transfer the data to the processor which uses the data from the other processor and the program sentences to confirm the reception of the transferred data before such data is used are also automatically added to the original sequential program.

SUMMARY OF THE INVENTION

According to the conventional technique mentioned last, since the first process (1) among the above three processes (1) to (3) is not automated, the user needs to decide the data dividing pattern which is considered to be optimum on the basis of his experiments or the like.

For general sequential programs other than a special sequential program in which an access situation of the data which is used has clearly been known, the optimum dividing pattern to divide the data that is processed by the program can be determined by only trial and error according to the conventional technique.

There is, consequently, a problem such that the optimum data dividing pattern is not always decided from a viewpoint of the executing time of parallel programs.

It is very troublesome for the user to repeat such trial and error.

It is an object of the present invention to provide an evaluating method of an effective data dividing pattern which can be applied to various sequential programs.

Another object of the invention is to provide a program operation analyzing method which is useful for evaluation of a data dividing pattern.

Still another object of the invention is to provide a parallel program producing method using such an evaluating method of the data dividing pattern.

To accomplish the above objects, according to the present invention, there is provided an evaluating method of a data dividing pattern, comprising the following steps.

(a) Data which is processed by a sequential source program to be converted into parallel programs is divided into a plurality of data groups in accordance with a plurality of data dividing pattern candidates to divide such data.

(b) Each of the data groups is allocated to one of a plurality of processors included in a distributed memory parallel computer in accordance with predetermined rules.

(c) A plurality of different partial processes in the processes of the sequential source program are allocated to each processor in accordance with the predetermined rules.

(d) In a state in which those plurality of data groups have been allocated to each processor by the step (b), an amount related to an executing time that is necessary to execute in parallel the plurality of partial processes allocated to the processors by the step (c) is estimated as evaluation information of one of the data dividing pattern candidates.

(e) The processes in steps (a) to (d) are repeated with respect to each of the other plurality of data dividing patterns. Further, according to a more desirable aspect of the invention, an evaluation program to evaluate a sequential program while executing the sequential program by a sequential computer is produced.

Further, a suitable data dividing pattern is selected by using the result of the evaluation by the evaluating program. Moreover, the sequential program is further converted into the parallel programs by using the suitable data dividing pattern selected.

According to another desirable aspect of the invention, in order to estimate the amount about the processing time of the programs to be executed by the distributed memory parallel computer, the following processing steps are used.

(a) The data which is included in a sequential program and should be processed by a plurality of processors is divided into a plurality of data groups in accordance with a predetermined data dividing pattern.

(b) Those plurality of data groups are allocated to the processors in accordance with the corresponding relation between the data groups and the processors which has been predetermined in correspondence to the data dividing pattern.

(c) The process which is specified by the sequential program is divided into a plurality of partial processes so that a statement to define to the data groups which are allocated to the self processor is executed by the self processor. Each partial process is allocated to each processor.

(d) A transmission command and a reception command of data which are necessary when the data and the process have been allocated to the processors by the steps (b) and (c) are inserted into the sequential program.

BRIEF DESCRIPTION OF THE DRAWINGS

FIG. 2 is a diagram showing an example of an application problem solving method source program;

FIG. 6 is a diagram showing the detailed content of an insertion code for an evaluation source program;

FIG. 8 is an explanatory diagram of a specific example of an evaluation program;

FIG. 10 is an explanatory diagram of the practical contents of a data dividing function library;

DESCRIPTION OF THE PREFERRED EMBODIMENT

Figure 1:
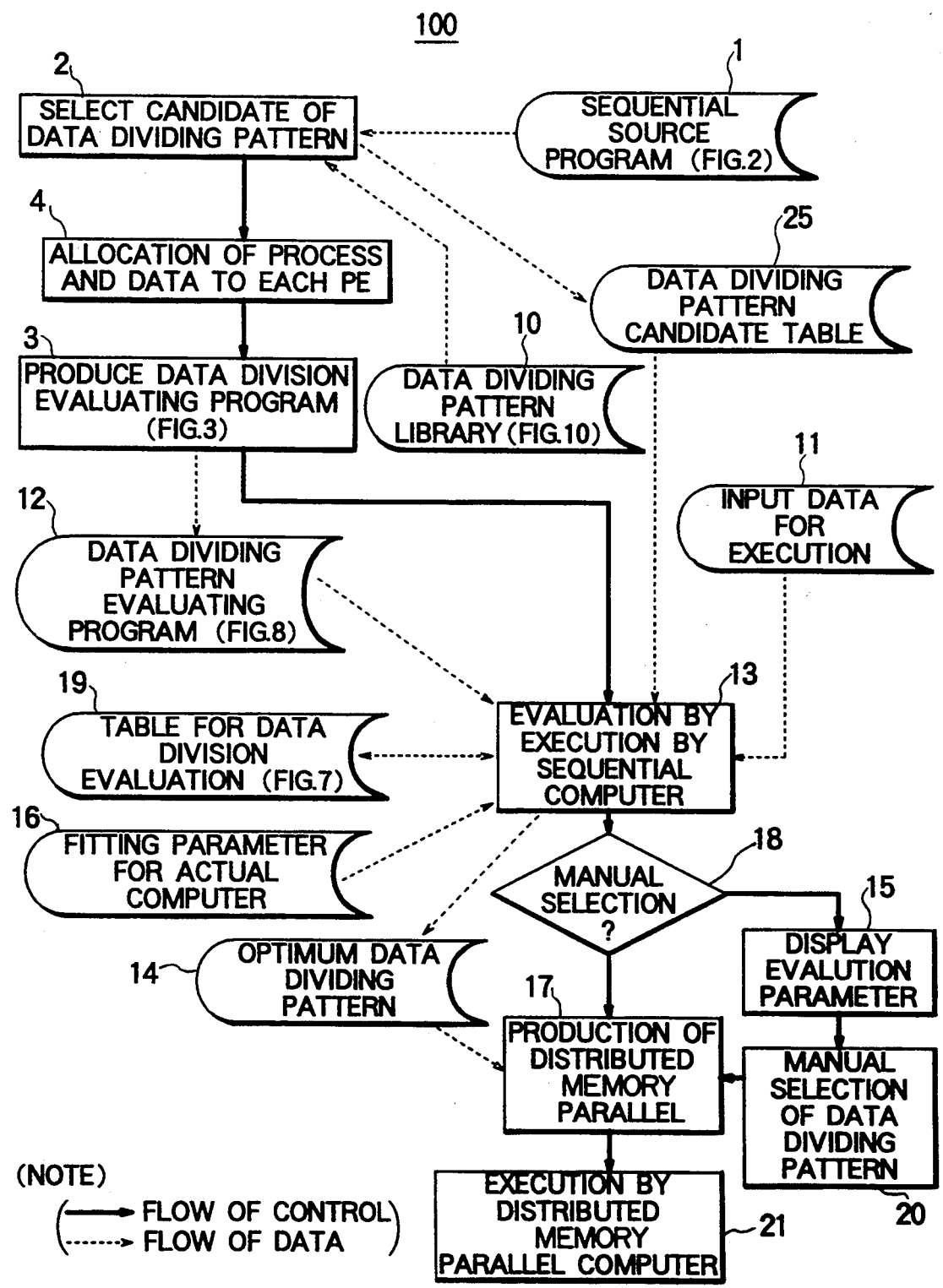
FIG. 1 is a whole constructional diagram showing an embodiment of the present invention.

An embodiment of the present invention will be described hereinbelow with reference to the drawings, FIG. 1 is a diagram showing a whole construction of a program converting process 100 to convert a sequential source program into parallel programs for a distributed memory parallel computer, Such a process itself is executed by a sequential computer (not shown), Numeral 1 denotes a sequential source program described by a program language for a sequential computer. FIG. 2 shows an example of such a program.

Numeral 10 denotes a data dividing pattern library in which various data division converting patterns which can be used in the process have been registered.

Numeral 2 denotes a process to select on the basis of the library 10 a candidate 25 of a data dividing pattern which is used for each of data to be divided in the program 1, namely, each of arrays included in the loop portion to be processed in parallel.

Numeral 4 denotes an allocating process to decide data and process which are allocated to each processor in correspondence to each data dividing pattern candidate when each of the data dividing pattern candidates decided by the above process 2 is used.

Numeral 3 denotes a process to produce a program 12 to evaluate each data dividing pattern candidate.

Numeral 13 denotes an executing step of the evaluating program 12. The evaluating program 12 is executed by the sequential computer. By the execution of the program 12, several parameters related to an executing speed of parallel programs which will be obtained in accordance with the allocation determined in correspondence to each data dividing pattern candidate by the process 2 are evaluated in correspondence to each data dividing pattern candidate. By using the result of the evaluation, a data dividing pattern 14 that is optimum from a viewpoint of the executing performance is determined from among the data dividing patterns. When the evaluating program 12 is executed, a practical example of the input data that is necessary by the inherent sequential program 1 is used as input data 11. Further, to reflect the characteristics of the actual parallel computer which is used to execute the parallel programs to the evaluation, a fitting parameter 16 for the actual computer regarding the parallel computer can be also used. Numeral 19 denotes a data division evaluation table in which the results of the evaluation for the various parameters evaluated by the above evaluation are stored.

Numeral 17 denotes a process to produce parallel programs for use in the distributed memory parallel computer in accordance with the optimum data dividing pattern selected as mentioned above. Numeral 21 denotes an actual executing step of the parallel programs.

In the embodiment, not only the optimum data dividing pattern can be automatically selected but also the user can manually select the optimum data dividing pattern on the basis of the result of the evaluation by the evaluating program 12. That is, in step 18, the user judges whether the optimum data dividing pattern is manually selected or not. When the user selects the manual selection, the result of the evaluation of the parameter is displayed in step 15. The user observes the displayed result and manually selects the optimum data dividing pattern (step 20). After that, the process 17 to produce the parallel programs and the executing step 21 follow in a manner similar to the case mentioned above.

It is the first feature of the embodiment that the parallel programs are produced and before they are executed, the performance at the time of execution of the parallel programs is presumed on the basis of a plurality of data dividing pattern candidates.

It is, further, the second feature of the embodiment that the optimum data division is automatically or manually decided by using the result of the evaluation before the parallel programs are produced.

Practically speaking, when the given sequential source program 1 is executed by the distributed memory parallel computer, the data dividing pattern which is considered that the calculating time is shortest is decided. The process in FIG. 1 will now be described in detail hereinbelow.

The data dividing pattern library 10 will be first explained.

FIGS. 19A-19F show parts of various data dividing patterns which are used in the embodiment. The diagram shows examples in the case where an array comprising (8×8) elements is divided into four data groups. The number of data groups is determined in accordance with the number (assumes 4 here) of processors included in the parallel computer which is used. Those numerical values are merely shown as examples. In the diagram, a portion shown by a bold line indicates a boundary of data groups. Each of the numerical values 0 to 3 shown in the data groups indicates the number of processor to which the data group is allocated. The process such that a certain data group is allocated to a certain processor denotes that the data group is held in a local memory connected to the processor. In the case where a certain array was divided in accordance with a certain data dividing pattern, a plurality of situations exist as a situation in which a plurality of data groups which are obtained by such a division are allocated to which processor. In the embodiment, however, a plurality of data groups obtained by the data dividing pattern are allocated to each processor in accordance with one rule which is considered to be suitable every data dividing pattern.

Each data dividing pattern shown in FIGS. 19A-19F will be explained in the description about the data dividing pattern library 10. FIGS. 19A-19F show typical data dividing patterns for a two-dimensional array. The present invention is also obviously effective to an array having three or more dimensions.

FIG. 10 shows the contents of the data dividing pattern library 10. In the library, each data dividing pattern is expressed by a data dividing function.

The data dividing function shown in the diagram expresses the data dividing patterns shown in FIGS. 19A-19F.

In FIG. 10, the number of processors assumes p and it is now assumed that a series of numbers (0 to p−1) are given to the processors, respectively, and that the size of each dimension of the array is set to n.

Figure 19A:
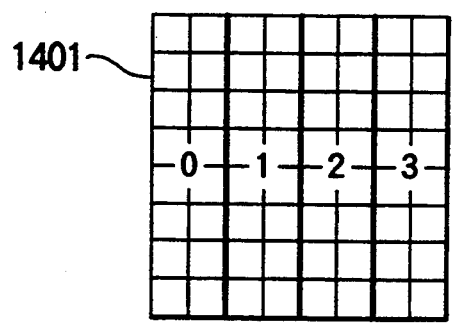
FIGS. 19A–19F are diagrams showing examples of data dividing patterns.

A data dividing function 1 (1001) corresponds to a data dividing pattern 1401 (FIG. 19A). The dividing pattern 1401 shows a column division of the whole array. According to the embodiment, in the data dividing pattern 1401, the n/p continuous column groups are sequentially allocated from the left in accordance with the ascending order of the processor numbers.

Figure 19B:
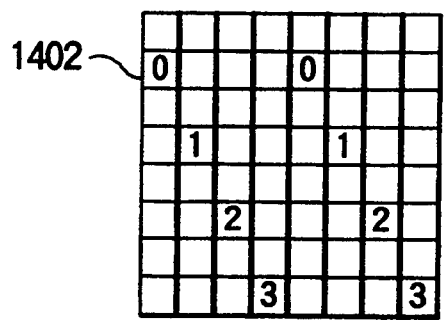
Figure 19C:
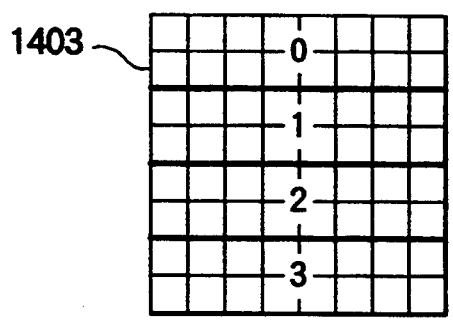
Figure 19D:
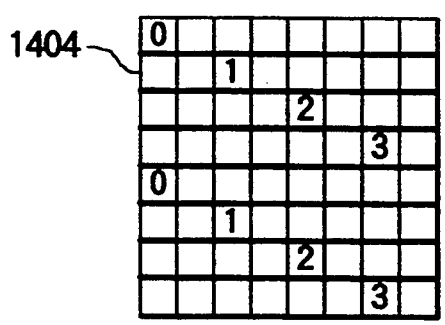
Figure 19E:
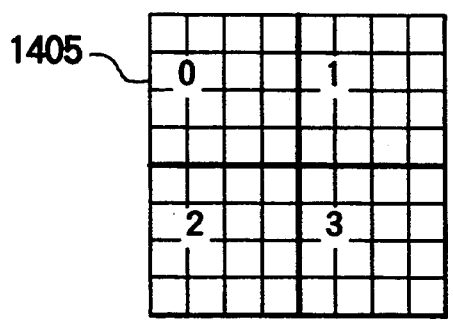
Figure 19F:
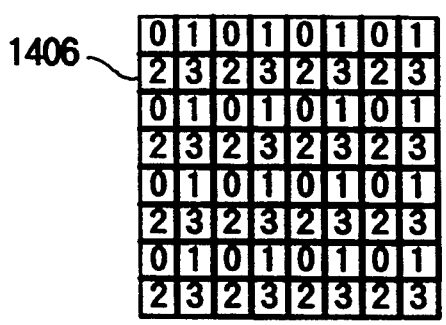
Figure 20:
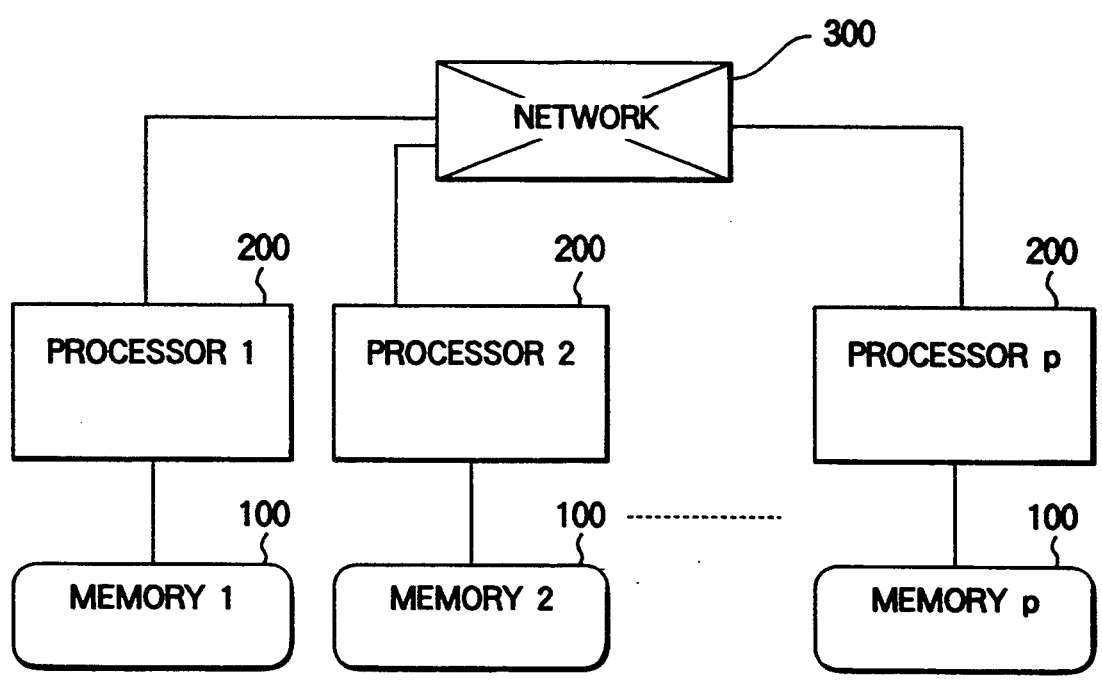
FIG. 20 is a diagram showing an example of a distributed memory parallel computer.

A data dividing function 2 (1002) corresponds to a data dividing pattern 1402 (FIG. 19B). Such a dividing pattern relates to a column division of the whole array. In the embodiment, each column is cyclically repeatedly allocated in accordance with the ascending order of the processor numbers.

A data dividing function 3 (1003) corresponds to a data dividing pattern 1043 (FIG. 19C) and relates to a row division of the whole array. In the embodiment, the n/p continuous row groups are sequentially allocated from the top in accordance with the ascending order of the processor numbers.

A data dividing function 4 (1004) corresponds to a data dividing pattern 1404 (FIG. 19D) and relates to a row division of the whole array. In the embodiment, each row is cyclically repeatedly allocated in accordance with the ascending order of the processor numbers.

A data dividing function 5 (1005) corresponds to a data dividing pattern 1405 (FIG. 19E) and relates to a division in which the data dividing patterns 1001 and 1003 are combined. According to the embodiment, a partial array of a size of (n/p)*(n/p) is allocated to each processor.

A data dividing function 6 (1006) corresponds to a data dividing pattern 1406 (FIG. 19F) and relates to a division in which the data dividing patterns 1002 and 1004 are combined. In the embodiment, to each partial array of a size of (n/p)*(n/p), the elements in the partial array are allocated one by one to each processor.

Dividing functions for data dividing patterns other than the above data dividing patterns can be added to the library 10 as necessary by the user.

The candidate forming process 2 of the data dividing pattern will now be described.

As for each array in the source program 1 here, the candidates of a plurality of data dividing patterns to allocate those arrays to each processor are selected by using the data dividing pattern library 10 by the user. The result is set as a candidate 25 of the data dividing pattern.

When the source program 1 is as already shown in FIG. 2, the array to be data divided is only a. In general, however, a plurality of arrays to be data divided exist in the repetitive loop. In such a case, with respect to each array, the user selects the candidates of the data dividing patterns which can be used and select all of the different combinations of the data dividing patterns about different arrays.

Figure 11:
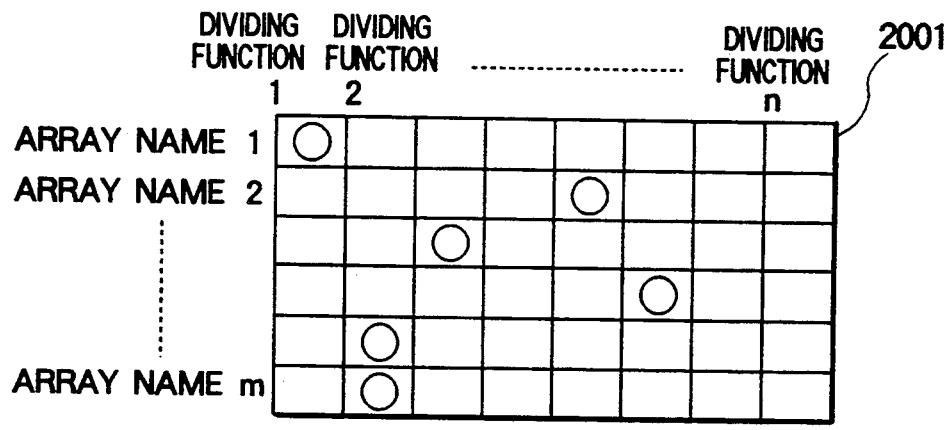
FIG. 11 is an explanatory diagram showing a method of specifying the data division.
Figure 14:
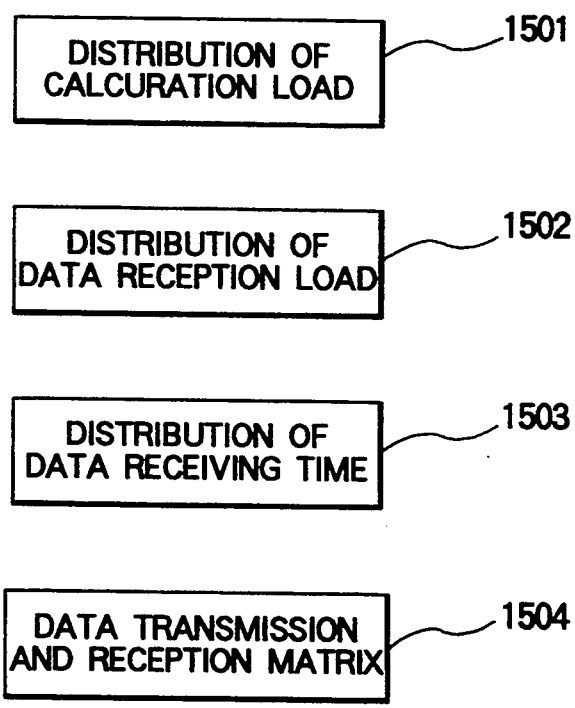
FIG. 14 is an explanatory diagram of an outline of the result of analysis.

FIG. 11 is a table showing an internal expression of the candidates 25 of the data dividing patterns selected as mentioned above. The dividing pattern which is used to each of the arrays appearing in the source program 1 is expressed in accordance with which one of the dividing functions in the data dividing pattern library 10 is used.

The process 4 will now be described.

In the process 4, the data group and process to be allocated to each processor are determined on the basis of the data dividing pattern candidates 25.

The plurality of data groups which are obtained in the case where the array was divided in accordance with each data dividing pattern candidate selected for each array data are unconditionally allocated to the different processors in accordance with the rule specified by the data dividing function for the data dividing pattern. Those plurality of data groups can be also allocated by another rule. Such an allocating method can be also changed in accordance with a plurality of rules.

After partial data of each array was allocated to each processor as mentioned above, the processes to be allocated to each processor are determined. That is, in the repetitive loop in the source program, the number of repetition times at which the process is executed by each processor is decided. In the embodiment, the loop will be divided and allocated to each processor so as to execute the process at the number of repetition times of the loop including the process to define each data belonging to the data group which is allocated to the self processor by the data dividing pattern. This is because by allocating the processes as mentioned above, it is possible to expect that the data communication between the processors can be reduced. It is also possible to change the allocation of the processes in accordance with another rule. The allocation can be also changed in accordance with a plurality of rules.

The evaluating program producing process 3 will now be described.

In the process 3, an amount regarding the processing time that is necessary for each processor to execute the process which is determined by the above process is presumed. The presumed amounts for the data dividing patterns are also compared and evaluated and the optimum division is selected from among the data division candidates. The evaluating program 12 to generate those information as graphic image is produced.

Figure 3:
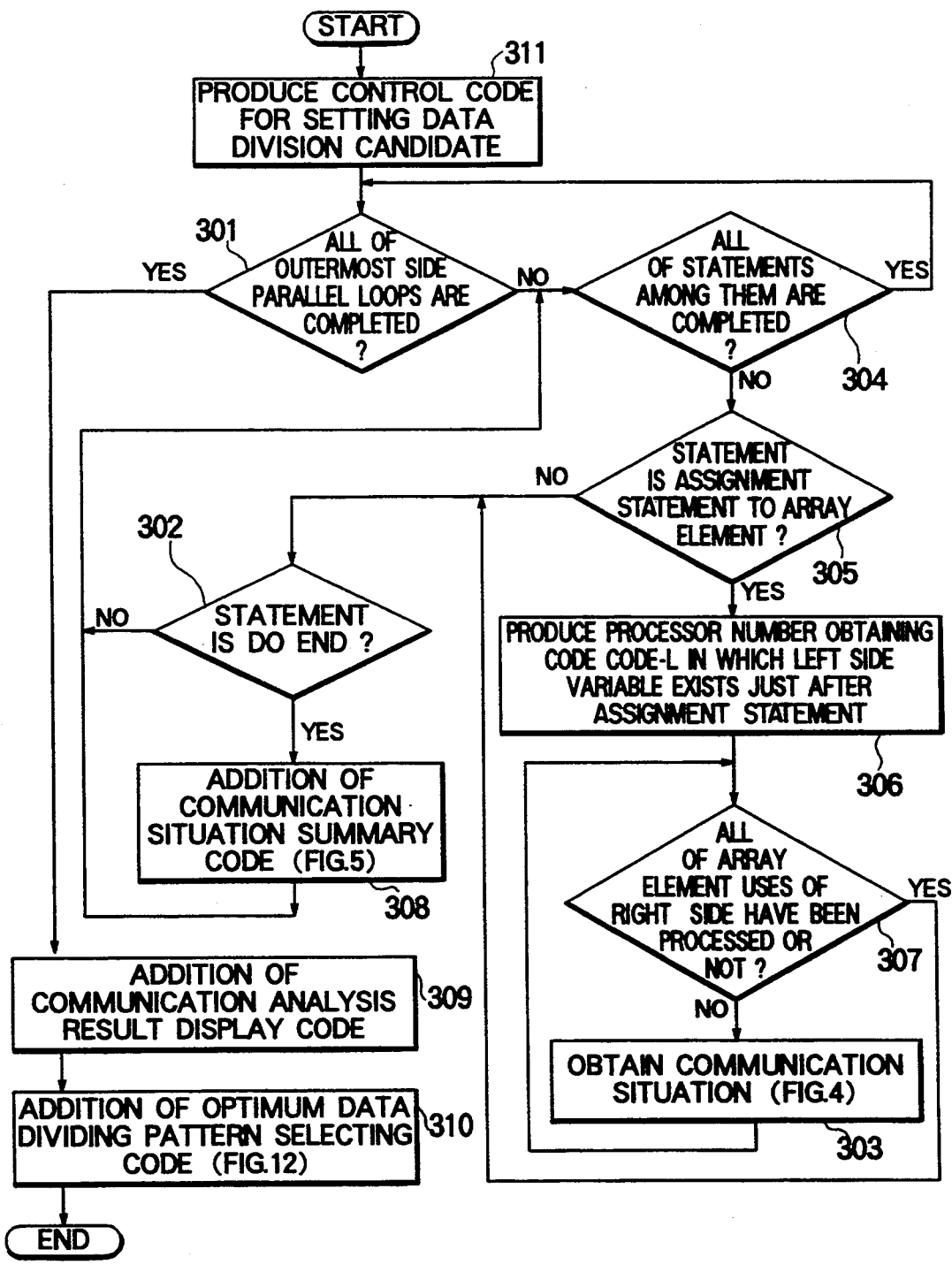
FIG. 3 is a detailed diagram of an evaluating program producing process.

FIG. 3 shows a procedure for the process 3. The evaluating program 12 is used to mainly grasp the amounts regarding the above processing time by executing the source program 1 by the sequential computer. This is because the number of loop repetition times in the source program 1 is set to a variable or the like and an amount of information which can be decided only by executing the program is large. As amounts regarding the processing time mentioned above, specifically speaking, the following values are collected: namely, an amount of arithmetic operations of each processor; a total amount of reception data; the total number of receiving times; an average arithmetic operation load of each processor; a standard deviation of the arithmetic operation load; a degree of confusion of the communication between the processors; the number of arithmetic operating times/the number of reception data; and the number of reception data/the number of receiving times.

In the process 3, a code to input the data division candidates as targets for evaluation is produced by a process 311. The process is constructed by a double loop which contains both a discriminating step 301 of judging whether the outermost side parallel loops in the source program 1 were exhaustively picked up, and a discriminating step 304 of judging whether all of the statements in such a loop were picked up. The process of the statements is divided into two processing steps in accordance with the result of a discriminating step 305 of judging whether the statement is an assignment statement to the array elements or not. In case of the assignment statement to the array element, a left side array element allocation processor obtaining code code-L is formed just after the assignment statement in a processing step 306. After that, a communication situation obtaining process 303 is executed to all of the array element uses in the right side of the assignment statement. In a discriminating step 307, a check is made to see if such a process 303 has been completed for all of them or not. On the other hand, a check is made in step 302 to see if the target statement is a "do end statement" or not.

If YES, a communication situation summary code is added in step 308. After that, a check is made in step 304 to see if the above process has been completed for all of the statements or not. If NO in step 304, the processing routine is again returned to step 305. If YES in step 304, step 301 follows and the processes of the next outermost side parallel loop are executed. When all of the outermost side parallel loops are completely processed, a communication analysis result display code is added in step 309. An optimum data division selection code is subsequently added in step 310. The whole process 3 is finished.

Figure 4:
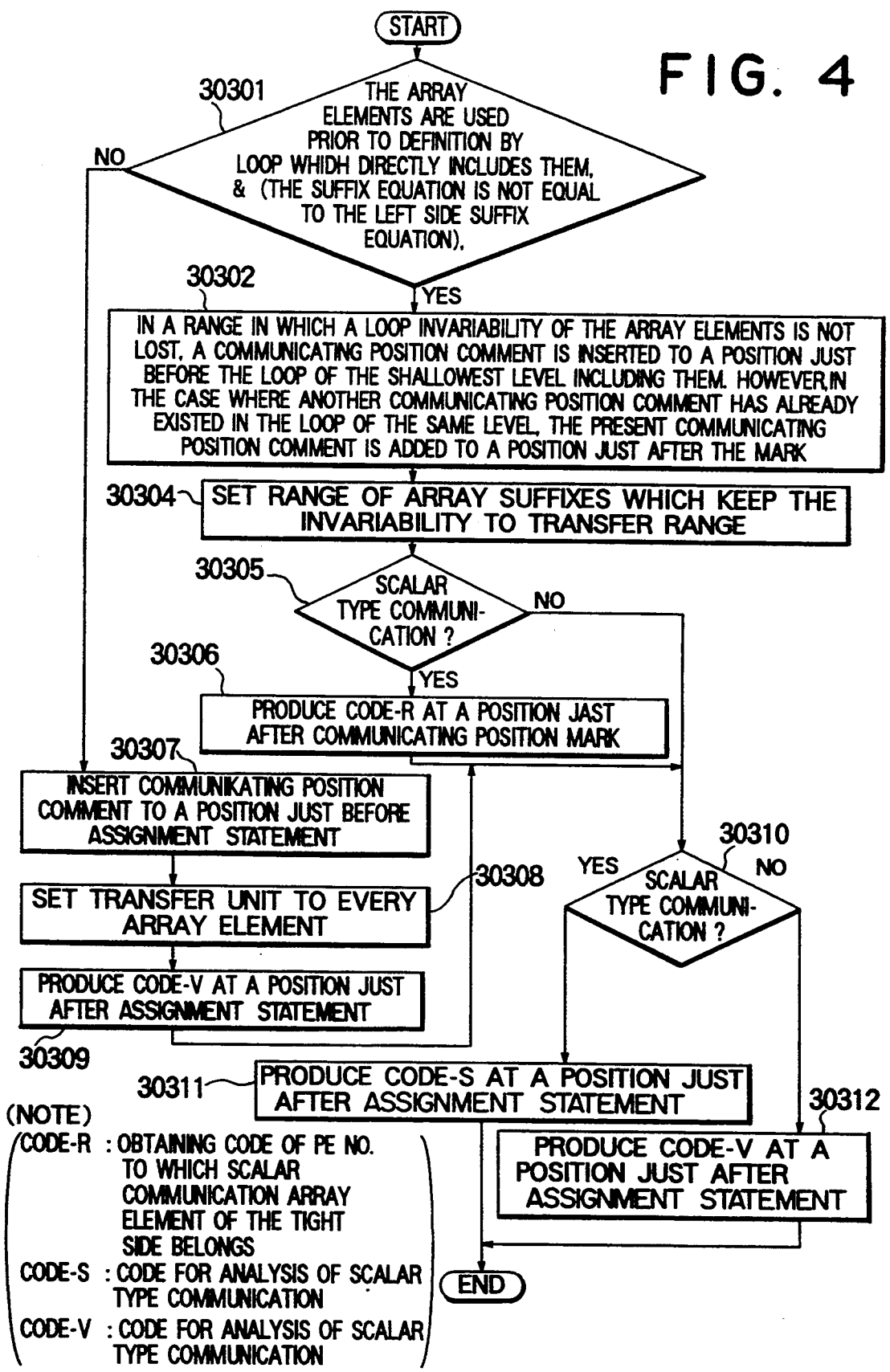
FIG. 4 is a detailed diagram of a communication situation obtaining process.

FIG. 4 shows the details of the communication situation obtaining process 303. First, terms are defined. The scalar type communication denotes the case where the data to be received is single data in a communicating position marking process, which will be explained hereinlater. The vector type communication denotes the case where the data to be received in such a process is a certain portion in the array. In step 303, in the first step 30301, a check is made to see if the following compound conditions are satisfied or not: namely, the array elements of the right side of the assignment statement are used in the loop which directly includes them prior to defining; a subscript expression of the array element is not equal to a subscript expression of the array of the left side; and the array elements of the right side are used in the loop for the first time. When those compound conditions are satisfied, step 30302 follows and a communicating position mark is inserted as a comment to a position just before the loop of the shallowest level including the values of the array elements of the right side, namely, the outermost loop within a range where a loop invariability of the values of the array elements of the right side is not lost. Such a process is the communicating position marking. This is because in order to suppress an overhead of the communication, such a process is necessary to reduce the number of receiving times by combining the data to be received as large as possible even when a reception data amount is equal. The location added with the communicating position mark is used as a receiving position to accomplish the above purpose. For instance, in the example of the source program 1, the receiving position for the array element a[k][k] appearing in the right side of an assignment statement 203 is located just before a loop 202. The communicating position mark is inserted as a comment between statements 201 and 202.

In the case where another communicating position mark has already existed in the loop of the same level, the present communicating position mark is added just after such a mark. In step 30304, a range of the suffix of the array in which the value doesn't change the loop in step 30301 is set into a partial range of the array to be transferred. In step 30305, a check is made to see if the array element relates to the scalar type communication or not. If YES, step 30306 follows and an obtaining code (code-R) 102 of the processor number to which the array element of the right side belongs is formed just after the communicating position mark. On the other hand, if NO in step 30301, step 30307 follows and the communicating position mark is added just before the assignment statement. In step 30308, a transfer unit is set to every array element. In step 30309, the obtaining code (code-R) 102 of the processor number to which the scalar communication array element of the right side belongs is formed just after the communicating position mark.

After the above processes, a check is made in step 30310 to see if the communication type is the scalar type or not. If YES, step 30311 follows and a code (code-S) 103 to analyze the scalar type communication is formed just after the assignment statement. On the contrary, if NO in step 30310, step 30312 follows and a code (code-V) 104 to analyze the communication of the vector type is formed just after the assignment statement.

Figure 5:
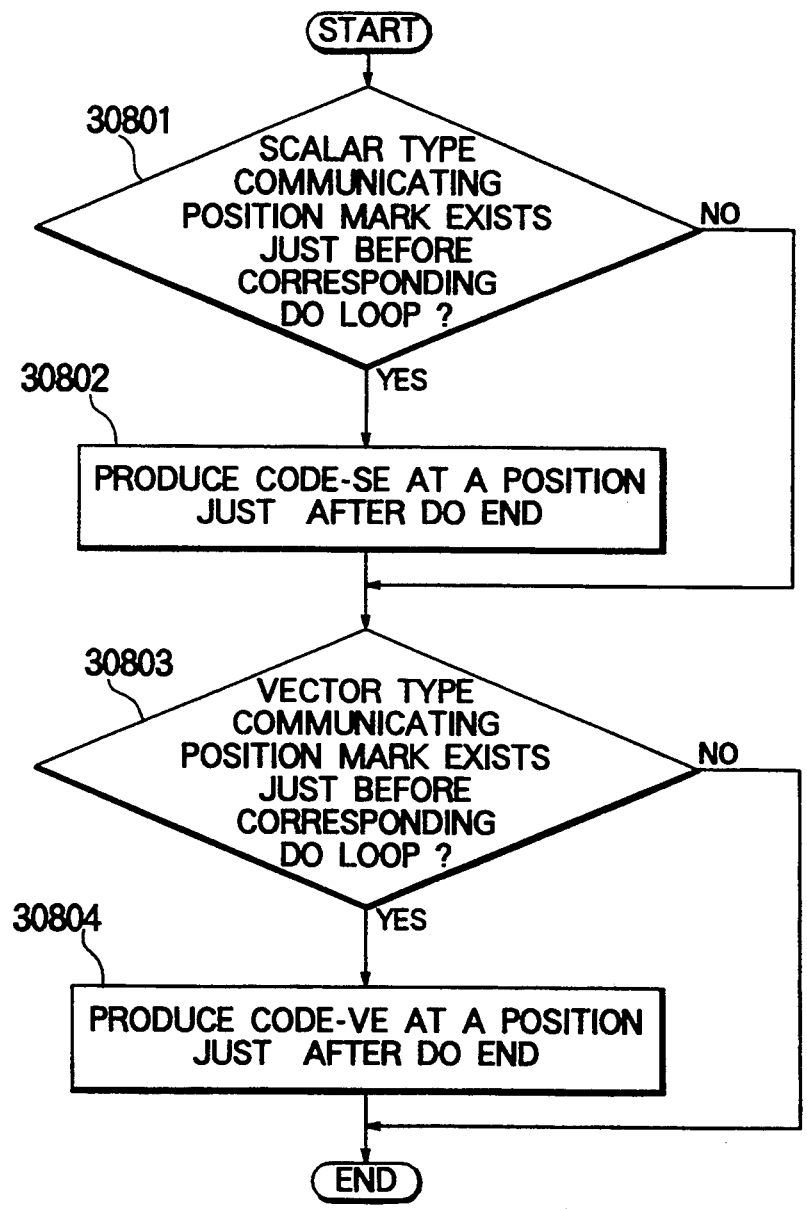
FIG. 5 is an explanatory diagram of an adding process of a communication situation summary code.
Figure 7A:
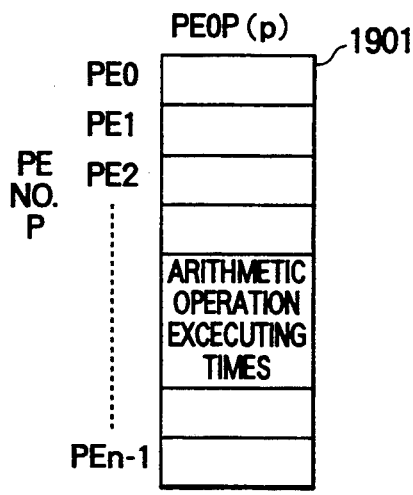
FIGS. 7A–7E are explanatory diagrams of a structure of table groups for evaluation.
Figure 7B:
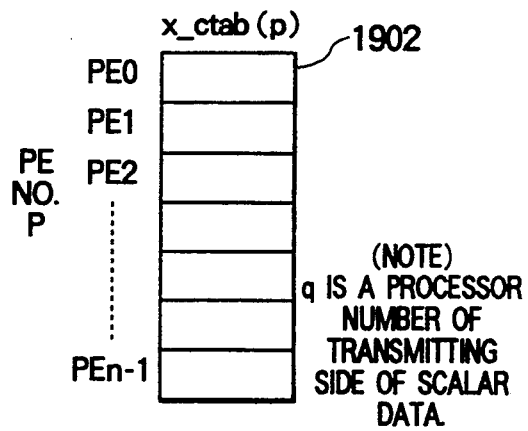
Figure 7C:
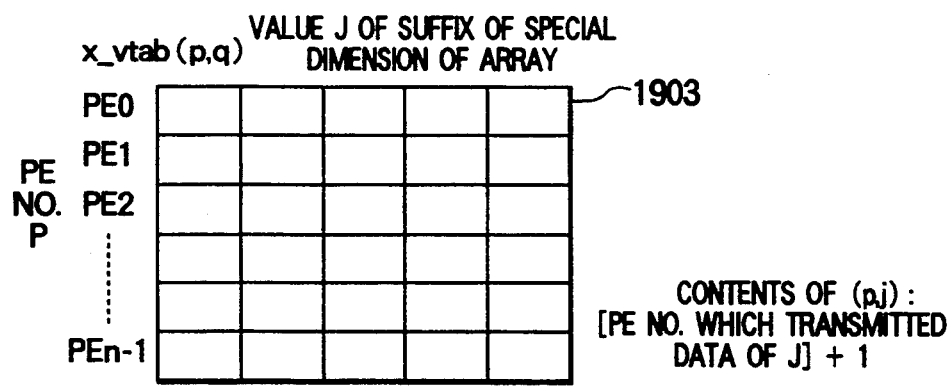
Figure 7D:
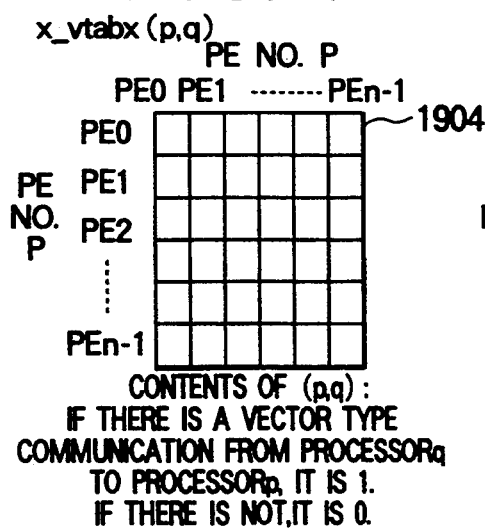
Figure 7E:
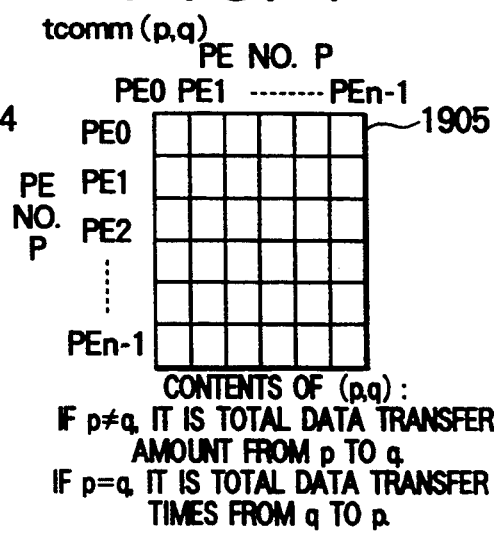
Figure 9A:
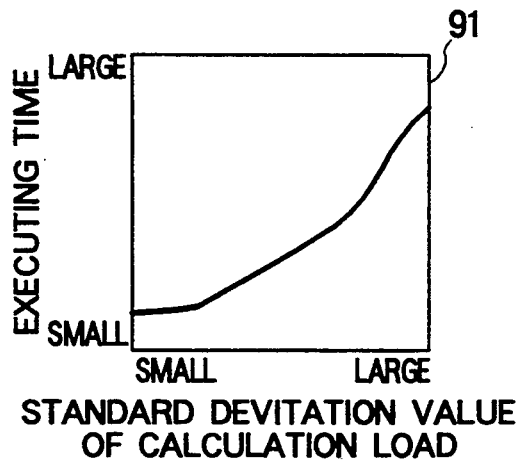
FIGS. 9A–9D are diagrams showing the correlation relations between the evaluation items and the executing time.
Figure 9B:
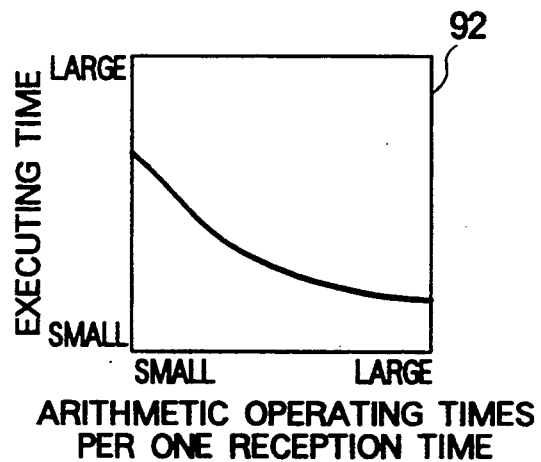
Figure 9C:
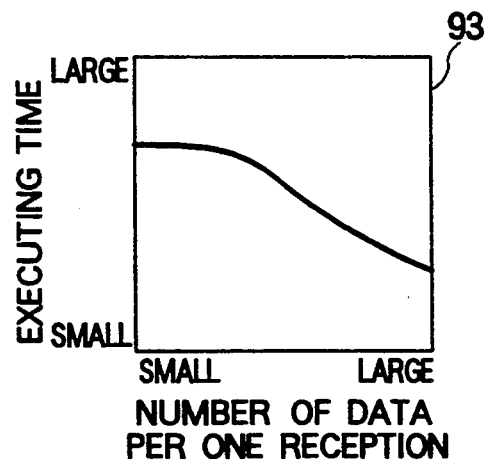
Figure 9D:
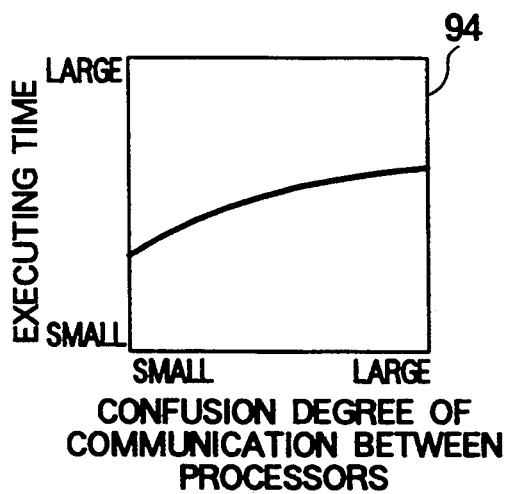

FIG. 5 shows the process 308 to add the communication situation summary code. In step 30801, a check is made to see if a scalar type communicating position mark exists just before the corresponding do loop or not. If YES, step 30802 follows and a scalar type communication situation cumulative processing code 105 is formed just after the do end sentence. In step 30803, a check is subsequently made to see if a vector type communicating position mark exists just before the corresponding do loop or not. If YES, step 30804 follows and a vector type communication situation cumulative processing code 106 is formed just after the do end sentence.

FIG. 6 shows insertion codes for the evaluating program. A table 19 for evaluation, which will be explained hereinlater, is used here. Numeral 101 denotes a left side array element allocation processor number obtaining code. Practically speaking, the code 101 denotes processes for fetching the suffixes (s, t) of the left side array element, for setting into values splitf (s, t) of the data dividing function as a processor number lhspe to which the array element belongs, and for adding an arithmetic operation amount which is required to calculate the right side to peop (lhspe). Numeral 102 denotes an obtaining code of the processor number to which the scalar communication array element of the right side belongs. Specifically speaking, the code 102 denotes processes for fetching suffixes (u, v) of the array element which is used in the right side and for setting a processor number rhspe to which the array element belongs into a value splitf (u, v) of the data dividing function. Numeral 103 denotes a code to analyze the scalar type communication. Practically speaking, in the case where a loop having a communicating position mark assumes x, so long as lhspe is different from rhspe for the array element, the code 103 is a code to execute the equation x_ctab (lhspe)=rhspe+1. Numeral 104 denotes a code to analyze the vector type communication. Specifically speaking, in the case where a loop having a communicating position mark assumes x and a vector suffix of the array element as a target for the vector type communication assumes j, so long as lhspe differs from rhspe for the array element, the code 104 is a code to execute the following two equations: namely, x_vtab (lhspe, j)=rhspe+1 and x_vtabx (lhspe, rhspe)=1.

Numeral 105 denotes a scalar type communication situation cumulative processing code. Specifically speaking, in the case where a loop in which the scalar type communicating position mark is written assumes x, the code 105 is a code for accumulating the number of data which is received by the processor p to a tcomm table from an x_ctab table, for increasing a diagonal portion of the tcomm table by +1 as the number of receiving times at which the processor p receives the data, and for clearing the content of the x_ctab table to "0". Numeral 106 denotes a vector type communication situation cumulative processing code. Practically speaking, in the case where a loop in which the vector type communicating position mark is located assumes x, the code 106 is a code for accumulating the number of data which is received by the processor p to the tcomm table from an x_vtab table, for adding x_vtabx to the diagonal portion of the tcomm table as the number of receiving times at which the processor p receives the data, and for clearing the contents of the x_vtab and v_vtabx tables into "0". Numeral 107 denotes a code to summarize the communication situation regarding the whole program. Practically speaking, the code 107 is a code for accumulating an amount of the number of arithmetic operating times of each processor, a total reception data amount, the total number of receiving times, an average number of arithmetic operating times and its standard deviation of the processor, a degree of confusion of the communication between the processors, the number of arithmetic operating times/the number of reception times, and the number of reception data/the number of receiving times, for selecting the division that is considered to be optimum from among the target data division candidates, and for generating those information as a graphic image.

FIGS. 7A-7E are diagrams showing the details of the table 19 for evaluation. The table 19 is constructed by five tables 1901 to 1905 shown in the diagram. As mentioned above, those tables are used by the insertion codes 101 to 107 for evaluating program. The sum of the number of arithmetic operation executing times by the processor p is set into a processor OP(p) of the table 1901. Now, assuming that reference suffixes of the array of the left side are set to (i, j) and the values of a data dividing function f is set to f(i, j), the arithmetic operation amount of the right side is added to a processor OP(f(i, j)). The table x_ctab(p) 1902 is a transmitting side processor number table in the scalar type communication. That is, in the loop x, the value which is obtained by adding +1 to the number of the processor which transmitted the data to the processor p by the scalar type communication. After completion of the loop existing just after the transmitting position, the above table is cleared to "0". The next table x_vtab(p, j) 1903 is a transmitting side processor number table in the vector type communication. In the loop x, the value which is obtained by adding +1 to the number of the processor which transmitted the data corresponding to the index j to the processor p by the vector type communication is set. After completion of the loop existing just after the transmitting position, the above table is cleared to "0". The table x_vtabx(p, q) 1904, which is concerned with the table 1903, shows a cross reference of the transmission and reception processor number in the vector type communication. In the loop x, "1" is set when the vector type communication is executed from the processor q to the processor p. On the other hand, "0" is set when such a communication is not executed. After completion of the loop existing just after the transmitting position, the above table is cleared to "0". On the other hand, the table tcomm(p, q) 1905 shows the value which is obtained by counting the total data transfer amount from the processor q to the processor p by the number of transferred data when p and q are different. The table 1905 shows the total number of receiving times at which the processor p received the data when p and q are equal.

FIG. 8 shows an example of program which is generated by the evaluating program producing process 3. Such an example of evaluation source program 12 is produced in correspondence to the example of the sequential source program 1 shown in FIG. 2. Loops 1201, 1205, and 1210 correspond to the triple loop of the inherent source program 1. As data communicating positions, reference numeral 1203 indicates a scalar type communication A(k, k); 1204 indicates a vector type communication A(k, j) (j=k+1 to n−1); and 1209 indicates another scalar type communication A(i, k). Those positions are determined as results that a communication point was moved to levels of a loop as shallow as possible so long as the value is not variable in the calculations in the loop. Numeral 1202 denotes an expression to calculate the processor number at which the element A(k, k) of the right side exists by calling the data dividing function. Numeral 1206 denotes an expression to likewise calculate the processor number to which the element A(i, k) of the right side is allocated by calling the data dividing function and to subsequently add a division as one arithmetic operation in order to accumulate the calculation amount on such a processor number. In an expression 1207, in the case where the array element of the right side and the array element of the left side exist in different processors, it is necessary to transfer the data from the number of the processor in which the array element of the right side exists to the allocated processor number of the left side array element, so that such a situation is recorded.

Numeral 1208 denotes an expression to obtain the number of the processor in which the right side array element A(i, k) exists in the updating process of the matrix elements. Since the element A(i, k) is determined to be the scalar type communication, processes 1211 and 1212 similar to the processes 1206 and 1207 are executed. Although numeral 1213 denotes a process to obtain the number of processor in which the right side array element exists, the communication A(k, j) (j=k+1 to n−1) is executed by the vector type different from the case of the process 1208. Different from the process 1207, therefore, according to the communication situation obtaining process, information is stored to i_vtab and i_vtabx by processes 1215 and 1216.

After completion of a loop j of 1218, the process of the communication accumulation about the A(i, k) which was communicated by the scalar type is executed by processing steps 1220, 1221, 1222, and 1223 and the result is stored into the table tcomm. In case of the vector type communication, such an accumulating process is slightly complicated and is executed by processing steps 1228, 1229, 1230, 1231, and 1232 and by processing steps 1236, 1237, and 1238. Namely, the contents of the tables i_vtab and i_vtabx are stored into the table tcomm.

FIGS. 9A-9D show tendencies of increase or decrease of the executing times to four evaluation items which are used in an adding process 310 of an optimum data division selecting code, which will be explained hereinlater. That is, numeral 91 shows a fact such that so long as the other conditions are equal, when a standard deviation of the calculation load of the processor as a first evaluation item increases, the executing time increases. Numeral 92 shows a fact such that so long as the other conditions are equal, when the number of arithmetic operating times per one receiving time as a second evaluation item increases, the executing time decreases. Numeral 93 shows a fact such that so long as the other conditions are equal, when the number of data per one reception as a third evaluation item increases, the executing time decreases. Numeral 94 shows a fact such that so long as the other conditions are equal, when the degree of confusion of the communication between the processors as a fourth evaluation item increases, the executing time increases.

Figure 12:
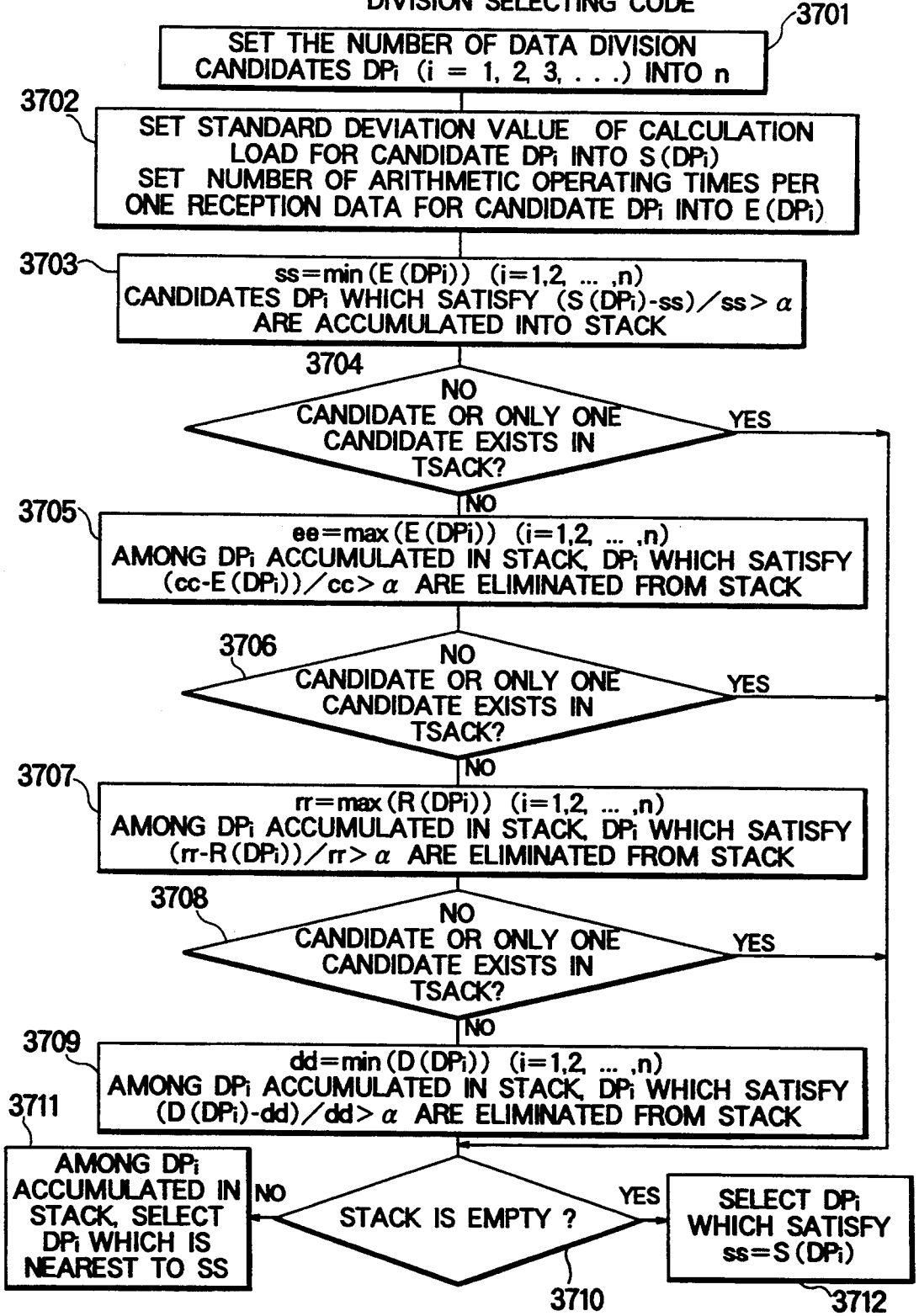
FIG. 12 is an explanatory diagram of an adding process of an optimum data division decision code.
Figure 13A:
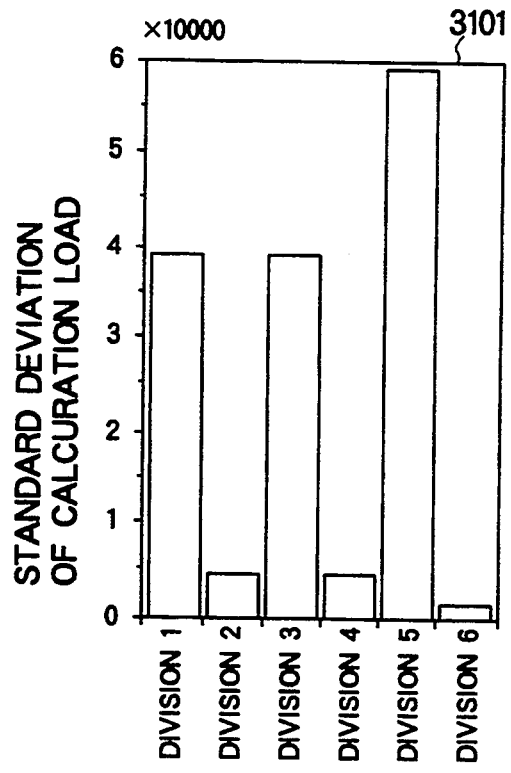
FIGS. 13A–13D are explanatory diagrams of evaluation items for automatically deciding data division.
Figure 13B:
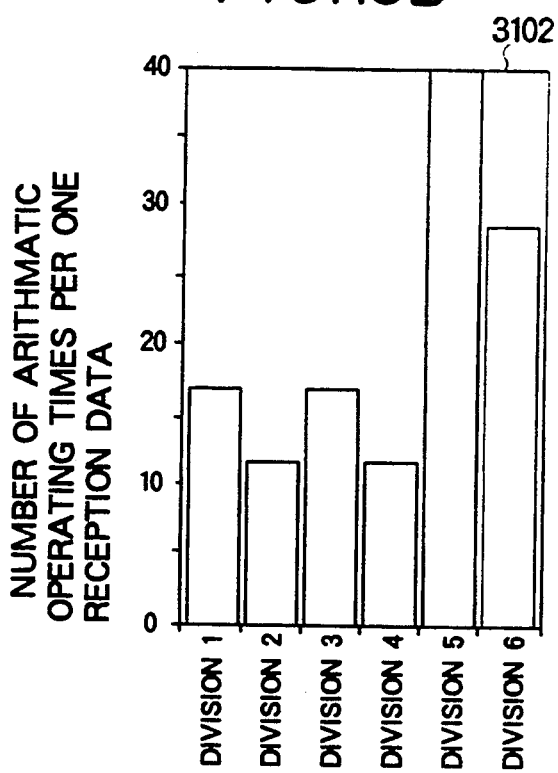
Figure 13C:
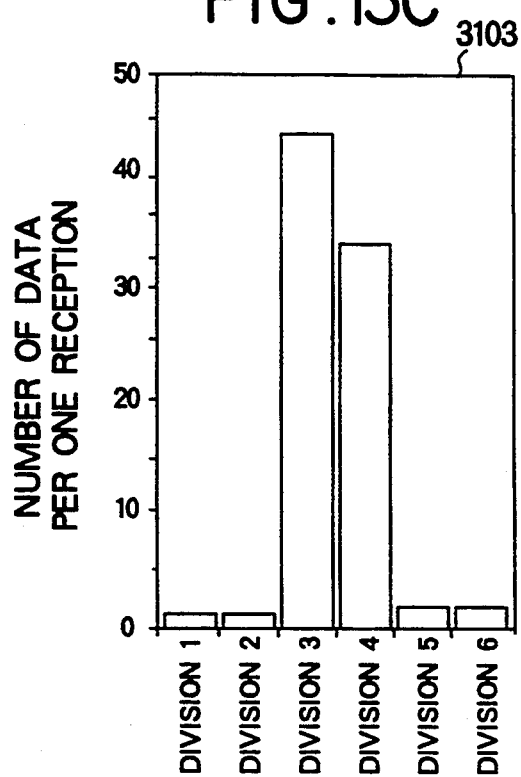
Figure 13D:
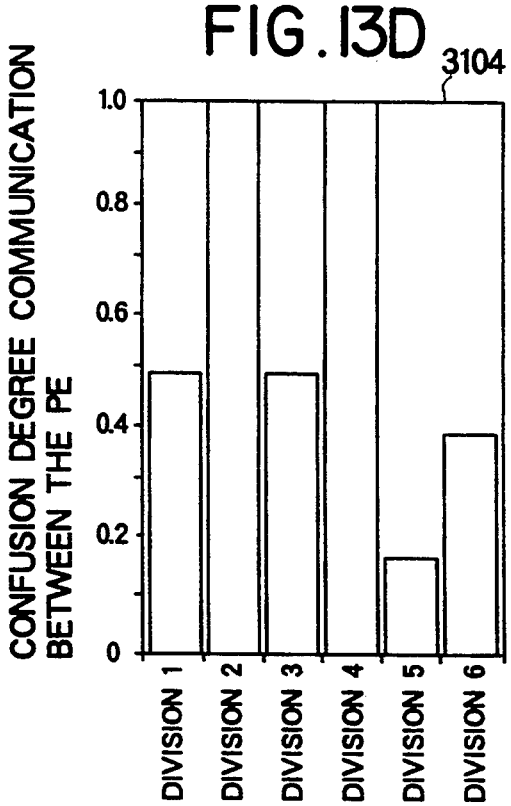
Figure 15:
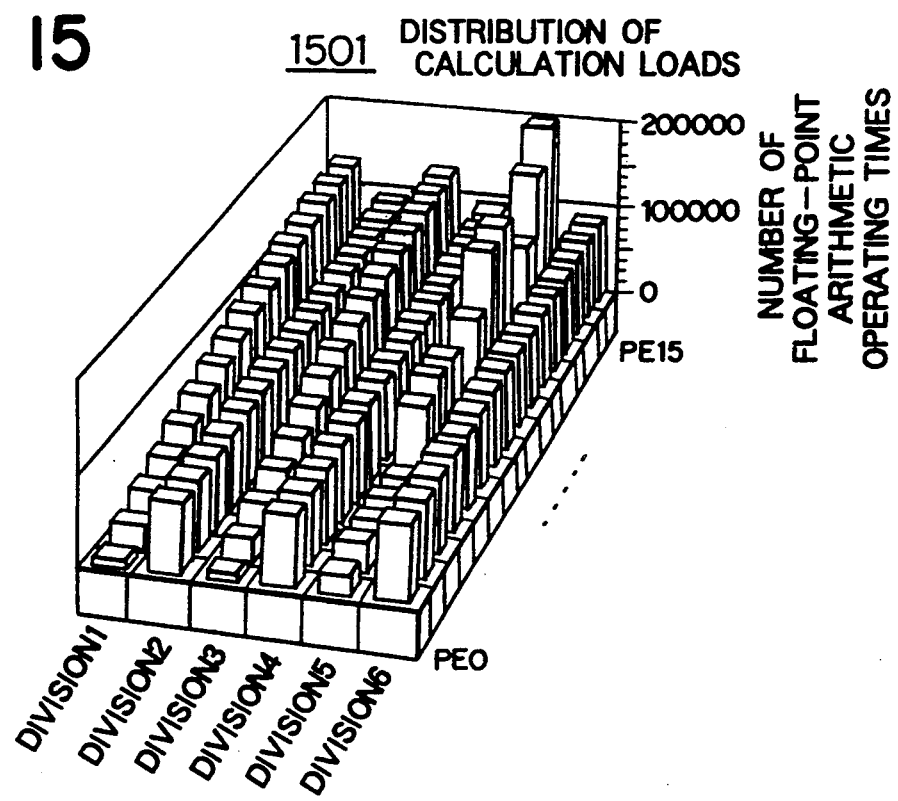
FIG. 15 is a diagram showing a specific example of a distribution of calculation loads.
Figure 16:
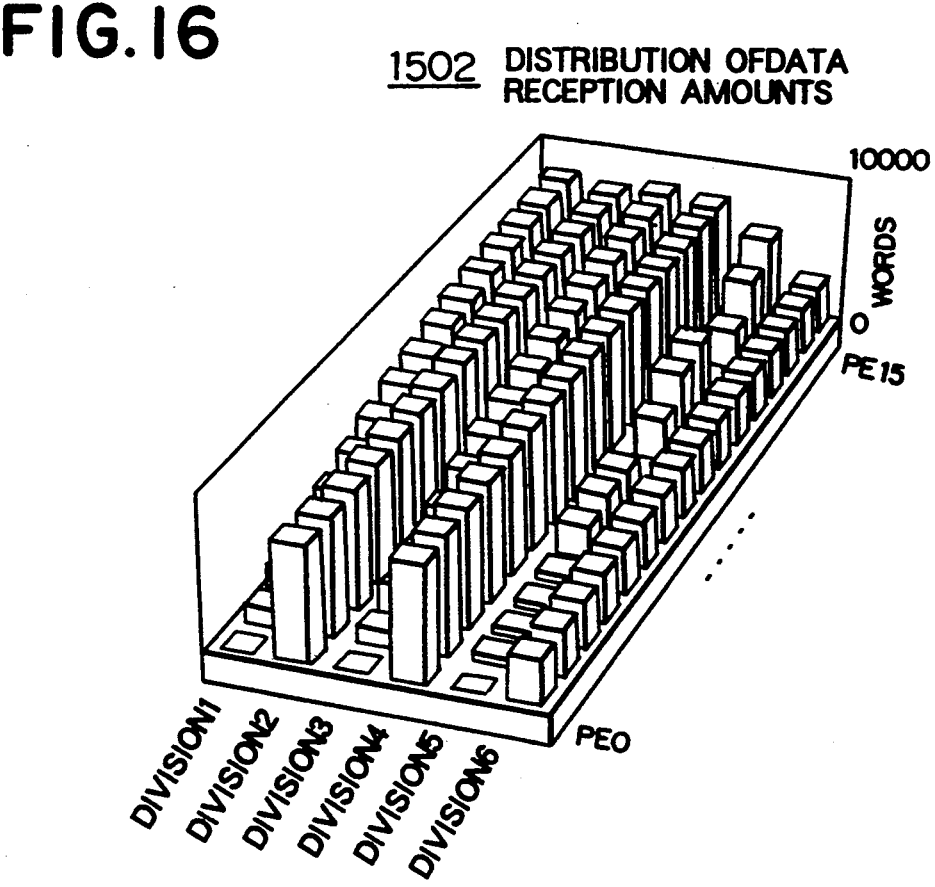
FIG. 16 is a diagram showing a specific example of a distribution of data reception amounts.
Figure 17:
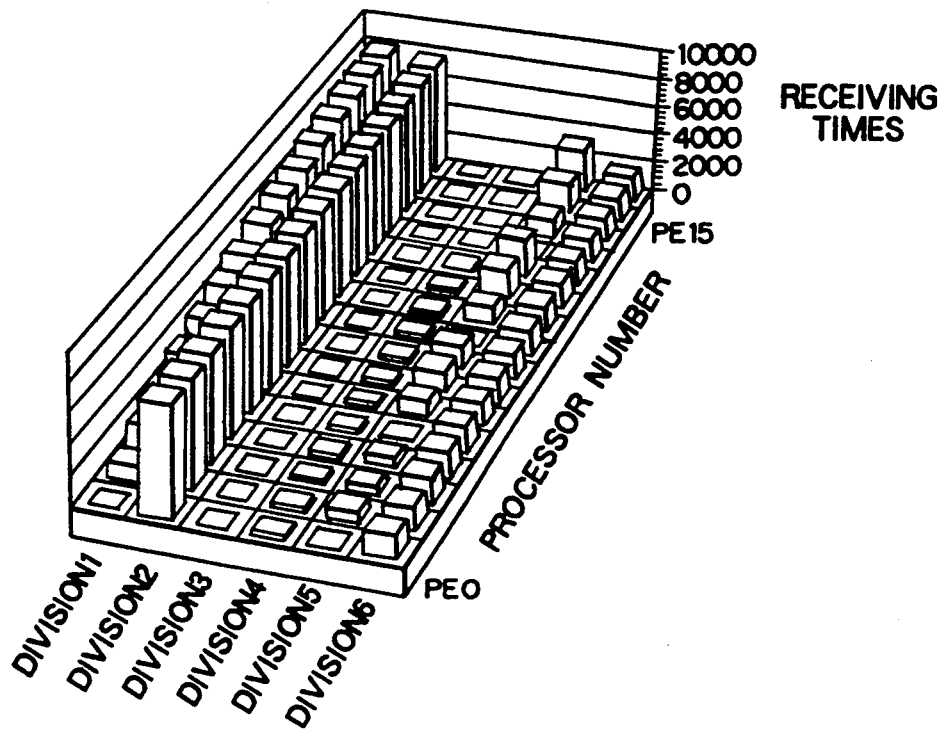
FIG. 17 is a diagram showing a specific example of a distribution of the numbers of data receiving times.
Figure 18:
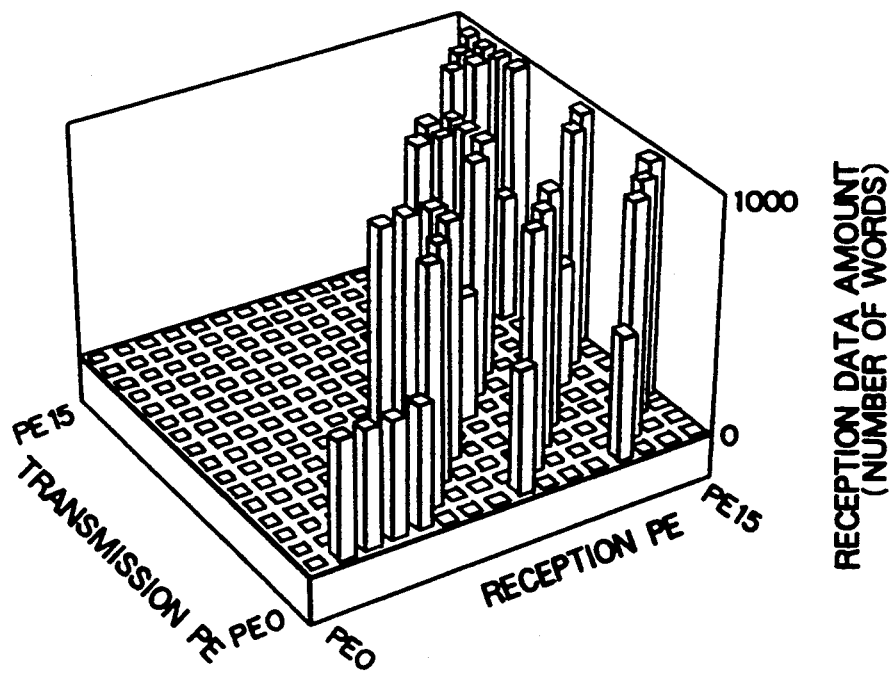
FIG. 18 is a diagram showing a specific example of a data transmission and reception matrix.

FIG. 12 shows the adding process 310 of the optimum data division selecting code. In step 3701, the number of data division candidates $DP_i$ is first set to n. The following four items are subsequently evaluated: namely, a standard deviation 3101 of the calculation load between the processors; the number of arithmetic operating times 3102 per one reception data; the number of reception data 3103 per one reception; and a degree of confusion 3104 of the data communication between the processors. The confusion degree of communication denotes a density in a data transmission and reception matrix 1504 indicating that the data communication has been performed from which processor to which processor. That is, the confusion degree indicates a ratio of the occurrence of the communication on a plane of a square in which the transmission processor and the reception processor are set to the sides of the square. The above four items can be easily calculated from the output results 1501, 1502, 1503, and 1504 of the program 12 (refer to FIGS. 14 to 18).

In the process 310, a data division candidate which is considered to be optimum is selected from among a plurality of data division candidates in the following manner. That is, in step 3702, a standard deviation value of the calculation load for the candidate $DP_i$ assumes $S(DP_i)$, the number of arithmetic operating times per one reception data assumes $E(DP_i)$, a reception data amount per one reception assumes $R(DP_i)$, and a confusion degree of the data communication between the processors assumes $D(DP_i)$. In the next step 3703, it is assumed that $ss = \min(S(DP_i))$ $(i=1, 2, \ldots, n)$, and the candidates $DP_i$ which satisfy the relation $(S(DP_i) - ss)/ss < \alpha$ are stored onto a stack, $\alpha$ is a parameter to give a reference to discriminate that with respect to the above four evaluation items, the items which are deviated by which extent from the best item are left as candidates to be selected without omitting here. Such a parameter is what is called a fitting parameter and should be adjusted in accordance with a degree of coincidence between the optimum data division that is decided in the embodiment and the optimum data division obtained by the actual measurement by the actual computer, $\alpha = 0.1$ is set as a default value.

In the process which will be explained hereinafter, with respect to the above four evaluation items 3101, 3102, 3103, and 3104, the candidates are successively decided. That is, in a discriminating step 3704, when no candidate or only one data division candidate remains on the stack, step 3710 follows. When two or more candidates remain, step 3705 follows and $ee = \max(E(DP_i))$ $(i=1, 2, \ldots, n)$ is set and the candidates $DP_i$ which satisfy the relation $(ee - E(DP_i))/ee > \alpha$ among the candidates $DP_i$ stored on the stack are eliminated from the stack. In discriminating step 3706, when no candidate or only one data division candidate remains on the stack, step 3710 follows. When two or more data division candidates remain, step 3707 follows and $rr = \max(R(DP_i))$ $(i=1, 2, \ldots, n)$ is set and the candidates $DP_i$ which satisfy the relation $(rr - R(DP_i))/rr > \alpha$ among the candidates $DP_i$ stored on the stack are eliminated from the stack. Further, in discriminating step 3708, when no candidate or only one data division candidate remain on the stack, the processing routine advances to step 3710. When two or more data division candidates remain, in step 3709, $dd = \min(D(DP_i))$ $(i=1, 2, \ldots, n)$ is set and the candidates $DP_i$ which satisfy the relation $(D(DP_i) - dd)/dd > \alpha$ among the candidates $DP_i$ stored on the stack are eliminated from the stack. When the stack is not empty in the next step 3710, the candidate $DP_i$ which is closest to the value of ss among the candidates $DP_i$ stored on the stack is selected in step 3711. On the contrary, when the stack is empty, the candidate $DP_i$ which satisfies $ss = S(DP_i)$ is selected in step 3712.

FIGS. 13A–13D specifically show the contents of the evaluation items to automatically decide the data division. In each diagram, an axis of abscissa indicates the data division candidate. Numeral 3001 denotes a standard deviation indicative of a variation of the calculation load in each processor for every data division candidate. Numeral 3102 denotes the number of arithmetic operations per unit reception data; 3103 indicates a reception data amount per one receiving process; and 3104 a confusion degree of the communication between the processors. As already mentioned above, the relations between those four evaluation items and the executing time are shown at numerals 91 to 94. When the evaluating program 12 is produced as mentioned above and is executed by the sequential computer in step 13, the optimum data dividing pattern 14 is decided.

The processes in case of manually selecting the optimum data division in discriminating step 18 shown in FIG. 1 will now be described.

In the communication analysis result displaying process 15, four data 1501 to 1504 are displayed by a three-dimensional graph. In the calculation load distribution 1501, the sum of the number of floating-point arithmetic operating times of each processor is shown for each division candidate. Due to this, the user can know the division of a good calculation load balance. In the data reception amount distribution 1502, the reception data amount of each processor is shown by the sum of the number of words for each division candidate. Thus, the user can know the division of a small total reception data amount. In the distribution 1503 of the data receiving times, the sum of the number of data receiving times of each processor is shown for each division candidate. Thus, the division in which the number of receiving times is small can be known. In the data transmission and reception matrix 1504, by which total amount of data from which processor each processor receives the data is shown for each data division candidate. Thus, a communication structure can be easily recognized and the division of a small density of the communication between the processors can be known. On the basis of the results of the observation of those graphs, a method of optimally divide the data is manually decided in step 20.

After the optimum dividing pattern was automatically or manually decided as mentioned above, the parallel programs for the distributed memory parallel computer are automatically produced in step 17 in FIG. 1. Such a process can be easily executed by using the data dividing pattern, the allocating method of the processes to each processor which has been mentioned with regard to the process 4 in FIG. 1, and a well-known compiler technique.

According to the invention, the amount regarding the processing time which is necessary for selection of the data dividing pattern can be presumed for various kinds of programs, so that a plurality of data dividing patterns can be evaluated with regard to the programs.

Further, according to a desired aspect of the invention, the data dividing pattern which is suitable from a viewpoint of the executing speed and is used for the distributed memory parallel computer can be decided for various sequential programs.

Various kinds of sequential programs, on the other hand, can be converted into the programs for use in the distributed memory parallel computer by using the above data dividing pattern.

According to the invention, in the above presumption, the result of the actual measurement by the actual parallel computer can be also reflected to the decision of the data dividing pattern in a manner such that the data dividing pattern which was determined more preferably coincides with the optimum data dividing pattern by the actual measurement by the actual parallel computer.

What is claimed is:

1. A method for evaluating a data dividing patterns used in converting a sequential program into parallel programs, executed by an apparatus, comprising the steps of:
   (a) dividing data which is processed by a sequential source program to be converted into parallel programs, into a plurality of data groups to be processed in parallel in accordance with one of a plurality of data dividing pattern candidates;
   (b) allocating each of said data groups to one of a plurality of processors included in a distributed memory parallel computer system, based on a predetermined data allocation rule;
   (c) allocating each of a plurality of partial processes required to execute a process requested by said sequential source program, to a corresponding one of said processors, based on a predetermined process allocation rule;
   (d) estimating, as evaluation information of said one of the data dividing pattern candidates for suitably allocating said plurality of data groups and partial processes to each of said plurality of processors, an amount related to an executing time required to execute in parallel the plurality of partial processes as allocated to said processors in the step (c), in a state in which said plurality of data groups are allocated to said processors in said step (b);
   (e) repeating said steps (a) to (d) with respect to each of others of said plurality of dividing patterns candidates; and
   (f) assigning said evaluation information to said amount related to said executing time estimated to each of said plurality of dividing patterns candidates based on predetermined priority, and ordering said plurality of dividing patterns candidates with ascending order of said evaluation information.

2. A method according to claim 1, wherein said estimating step of said amount related to the executing time includes:
   generating an evaluating program by adding to said sequential program a program code for collecting, at the time of executing said sequential program, said amount to measure the executing time; and
   executing said evaluating program by a sequential computer.

3. A method according to claim 1, wherein said amount related to the executing time includes a first amount related to an executing time required by each processor for execution of a processing assigned to said each processor, and a second amount related to a data transfer time required by said each processor for transfer of data between said each processor and others of said processors.

4. A method according to claim 1, wherein said amount related to the executing time includes:
   a distribution of calculation loads among said processors;
   a number of arithmetic operations executed by each processor for processing a unit amount of reception data received from other processors; and
   an average amount of reception data received by said each processor during one reception operation.

5. A method according to claim 1, further having the step of:
   selecting one of said plurality of dividing pattern candidates for each of a plurality of data processed by said sequential program, so that one combination of dividing pattern candidates are selected for said plurality of data, based on said evaluation information;
   wherein said steps (a) and (b) are executed for each of said plurality of data, based upon one dividing pattern candidates selected for said each data;
   wherein said repeating step (e) includes the steps of:
   repeating said step (f) before repetition of said steps (a) to (d), so that another combination of dividing pattern candidates is selected for said plurality of data; and
   executing the steps (a) to (d) for said another combination.

6. A method according to claim 1, further having the step of:
   registering each of said data dividing patterns into a library each in terms of data dividing functions each indicative of a corresponding relation between an index of an element of an array data to be divided and a number of serial of said processors to which said element should be allocated; and
   wherein said step (a) includes a step of:
   selecting one of the data dividing functions registered in said library for array data appearing in the sequential program and to be divided into data groups.

7. A method according to claim 1, wherein the data group allocation determining step (b) is executed in accordance with a data allocation rule which has been predetermined in correspondence to said one data dividing pattern used in said step (a).

8. A method according to claim 1, wherein the process allocation step (c) is executed in a manner such that a processing to define a value of data belonging to one of said data groups is allocated to one of said processors to which one processor said one data group has been allocated.

9. A method according to claim 1, further having the step of selecting one of said plurality of data dividing pattern candidates which is suitable to divide the data of said sequential program as to minimize said executing time, on the basis of amounts each evaluated for each of said plurality of data dividing patterns.

10. A method according to claim 9, wherein said amount related to the executing time includes:
   a distribution of calculation loads among said processors;
   a number of arithmetic operations executed by each processor for processing a unit amount of reception data required from other processors; and
   an average amount of reception data received by said each processor during one reception operation.

11. A method according to claim 9, wherein the selecting step of said suitable data dividing pattern candidate is executed further on the basis of a predetermined evaluation reference to determine whether said candidate is omitted or not.

12. A method according to claim 11, wherein the selecting step of said suitable data dividing pattern candidate is executed further on the basis of characteristics of said distributed memory parallel computer.

13. A method according to claim 9, further having a step of:
  displaying results of said estimating each with respect to one of said plurality of data dividing patterns candidates; and
  selecting said suitable data dividing pattern candidates, as instructed by a user.

14. A method according to claim 13, wherein said amount related to the executing time includes:
  a distribution of calculation loads among said processors;
  a number of arithmetic operations executed by each processor for processing a unit amount of reception data received from other processors; and
  an average amount of reception data received by said each processor during one reception operation.

15. A method according to claim 9, further having the steps of:
  executing again said steps (a) and (b) for said selected data dividing pattern candidate; and
  generating parallel programs to be executed by said distributed memory parallel computer system from said sequential program, in accordance with results of said steps (a) and (b) executed for said selected data dividing pattern candidate.

16. A method for evaluating an amount related to an executing time of a program to be executed by a distributed memory parallel computer system, executed by an apparatus, the steps including:
  (a) dividing data which is included in a sequential program and should be processed by a plurality of processors which belongs to said computer system, into a plurality of data groups, in accordance with a predetermined data dividing pattern;
  (b) allocating each of said plurality of data groups to a corresponding one of said processors;
  (c) dividing a process executed by said sequential program into a plurality of partial processes to be executed in parallel, and allocating each of said partial processes to one of said processors in such a manner that one of said processors executes a statement to define a value of data belonging to one of the data groups each of which is allocated to said one processor; and
  (d) evaluating an amount related to an executing required for execution of said partial processes by said processors, including:
  inserting into said sequential program, data transmission commands and data reception commands both of which are required for execution of said partial processes by said processors;
  wherein said evaluating is executed based upon the sequential program modified by said inserting.

17. A method according to claim 16, wherein said measuring step (d) further includes the steps of:
  measuring (1) a total number of data elements which does not belong to one of said data groups assigned to each processor, among data elements which are used by one of the plurality of partial processes assigned to said each processor, (2) a total number of using times by said each processor, of said data elements which does not belong to said one data group assigned to said each processor, (3) a total number of execution of reception operations required in order for said each processor to receive said data elements from other ones of said processors, and (4) a total amount of arithmetic or logical operations executed by one process assigned to each processor.

18. A method according to claim 16, wherein the measuring step further includes the step of:
  inserting into the sequential program, first program codes which are necessary to execute said steps (a), (b), and (c), and second program codes which are necessary to measure said amount related to said executing time of said sequential program modified by said inserting of said first and second program codes.

19. A method according to claim 18, wherein said executing of said modified sequential program is done by a sequential computer.

* * * * *